(12) United States Patent
Zhu

(10) Patent No.: US 12,157,826 B2
(45) Date of Patent: Dec. 3, 2024

(54) INK FORMULATIONS AND ASSOCIATED WRITING INSTRUMENTS

(71) Applicant: Sanford, L.P., Atlanta, GA (US)

(72) Inventor: Jiandong Zhu, Aurora, IL (US)

(73) Assignee: Sanford, L.P., Atlanta, GA (US)

( * ) Notice: Subject to any disclaimer, the term of this patent is extended or adjusted under 35 U.S.C. 154(b) by 654 days.

(21) Appl. No.: 16/648,830

(22) PCT Filed: Sep. 27, 2018

(86) PCT No.: PCT/US2018/053179
§ 371 (c)(1),
(2) Date: Mar. 19, 2020

(87) PCT Pub. No.: WO2019/067757
PCT Pub. Date: Apr. 4, 2019

(65) Prior Publication Data
US 2020/0224046 A1    Jul. 16, 2020

Related U.S. Application Data

(60) Provisional application No. 62/565,317, filed on Sep. 29, 2017.

(51) Int. Cl.
*C09D 11/00* (2014.01)
*C09D 11/18* (2006.01)
*C09D 11/20* (2006.01)

(52) U.S. Cl.
CPC ............. *C09D 11/18* (2013.01); *C09D 11/20* (2013.01)

(58) Field of Classification Search
CPC ... C09D 1/00; C09D 4/00; C09D 5/00; C09D 11/00; C09D 11/18; C09D 11/20; C09K 3/00

USPC .............. 106/31.01, 31.13, 31.6, 31.85
See application file for complete search history.

(56) References Cited

U.S. PATENT DOCUMENTS

| | | |
|---|---|---|
| 5,961,703 A | 10/1999 | Fraas |
| 5,981,626 A * | 11/1999 | Santini .................. C09D 11/16 106/31.27 |
| 2007/0043145 A1 | 2/2007 | Beck et al. |
| 2011/0009518 A1* | 1/2011 | Yabuuchi ............. C09D 167/07 522/183 |

FOREIGN PATENT DOCUMENTS

| | | | |
|---|---|---|---|
| EP | 2914667 B1 * | 8/2017 | ............... C08K 5/07 |
| EP | 2914669 B1 * | 12/2018 | ............. C09D 11/03 |
| GB | 2 461 147 A | 12/2009 | |
| JP | H02 294372 A | 12/1990 | |
| WO | 2014/042623 A1 | 3/2014 | |

OTHER PUBLICATIONS

Extended European Search Report, issued by the European Patent Office, Application No. 18863260.8, dated Jun. 28, 2021 (8 pages).
International Search Report and Written Opinion for International Application No. PCT/US2018/053179 mailed Dec. 12, 2018 (10 pages).

\* cited by examiner

*Primary Examiner* — James E McDonough
(74) *Attorney, Agent, or Firm* — Eversheds Sutherland (US) LLP

(57) ABSTRACT

Ink formulations and associated writing instruments are disclosed herein. In some embodiments, an ink formulation is provided which includes an ink resin or polymer and a biobased solvent. In some embodiments, an ink formulation is provided which includes an ink resin or polymer and a solvent comprising at least one lactate ester.

12 Claims, No Drawings

INK FORMULATIONS AND ASSOCIATED WRITING INSTRUMENTS

CROSS-REFERENCE TO RELATED APPLICATIONS

This application is a U.S. national stage application of International Application No. PCT/US2018/053179, filed Sep. 27, 2018, which claims the benefit of priority to U.S. Provisional Patent Application No. 62/565,317, filed Sep. 29, 2017, the disclosures of which are incorporated herein by reference in their entirety.

FIELD OF THE DISCLOSURE

This disclosure relates generally to ink formulations and associated writing instruments.

BACKGROUND

Certain ink formulations (e.g., for permanent markers, dry erase markers, pens) contain solvents that are petroleum-based and display various performance issues. For example, known ink formulations may display poor writing performance and having limited adhesion on certain substrates. Additionally, known inks may be prone to drying out when left uncapped in a writing instrument for extended periods.

Thus, improved ink formulations and writing instruments containing those ink formulations would be desirable.

DETAILED DESCRIPTION

Ink formulations and writing instruments containing ink formulations have been developed. For example, the ink formulations may contain a solvent or blend of solvents that is partially or wholly biobased. As used herein, the term "biobased" refers to a solvent that is non-petroleum based and that is derived from a renewable source (e.g., plant source).

Ink Formulations

In certain embodiments, an ink formulation contains an ink resin or polymer and a solvent. In some embodiments, the solvent contains at least one lactate ester, which may or may not be biobased. In other embodiments, the solvent is wholly biobased. That is, in certain embodiments, the ink formulation contains no petroleum based solvents.

For example, the at least one lactate ester, which may or may not be biobased, may be ethyl lactate, methyl lactate, n- or iso-propyl lactates, n- or iso-butyl lactates, i-amyl lactate, and/or 2-ehtylhexyl lactate. For example, a biobased solvent may contain one or more lactate esters or a blend of one or more lactate esters with one or more other solvents selected from esters, alcohols, glycol ethers, limonene and/or aliphatic hydrocarbon solvents. For example, the biobased solvent may be bio-propanol, bio-butanol, bio-methanol, bio-ethanol, biobased polypropylene glycols, biobased ethylene glycols, bio-glycol ethers, bio-based butanediol, biobased propanediol, bio-lactate esters, bio-acetate esters, D-limonene, methyl soyate, 2-methyltetrahydrofuran, and isohexane.

In some embodiments, the solvent or blend of solvents is present in an amount of from about 35 percent to about 95 percent, by weight of the ink formulation, for example about 35 percent by weight of the ink formulation, about 40 percent by weight of the ink formulation, about 45 percent by weight of the ink formulation, about 50 percent by weight of the ink formulation, about 55 percent by weight of the ink formulation, about 60 percent by weight of the ink formulation, about 65 percent by weight of the ink formulation, about 70 percent by weight of the ink formulation, about 75 percent by weight of the ink formulation, about 80 percent by weight of the ink formulation, about 85 percent by weight of the ink formulation, about 90 percent by weight of the ink formulation, about 95 percent by weight of the ink formulation, or any ranges therebetween. In some embodiments, the solvent is present in an amount of from about 45 percent to about 95 percent, by weight of the ink formulation. In some embodiments, the ink resin or polymer is present in an amount of from about 1 percent to about 40 percent, by weight of the ink formulation, for example about 1 percent by weight of the ink formulation, about 5 percent by weight of the ink formulation, about 10 percent by weight of the ink formulation, about 15 percent by weight of the ink formulation, about 20 percent by weight of the ink formulation, about 25 percent by weight of the ink formulation, about 30 percent by weight of the ink formulation, about 35 percent by weight of the ink formulation, about 40 percent by weight of the ink formulation, or any ranges therebetween. For example, the ink resin or polymer may be present in an amount of from about 3 percent to about 25 percent, by weight of the ink formulation, for example about 3 percent by weight of the ink formulation, about 5 percent by weight of the ink formulation, about 10 percent by weight of the ink formulation, about 15 percent by weight of the ink formulation, about 20 percent by weight of the ink formulation, about 25 percent by weight of the ink formulation, or any ranges therebetween. For example, the resin or polymer may be any suitable ink resin or polymer material, as are known in the art.

In certain embodiments, the ink formulation also includes a colorant present in an amount of from about 3 percent to about 40 percent, by weight of the ink formulation. For example, the colorant may be present in an amount of from about 3 percent to about 25 percent, by weight of the ink formulation, for example about 3 percent by weight of the ink formulation, about 5 percent by weight of the ink formulation, about 10 percent by weight of the ink formulation, about 15 percent by weight of the ink formulation, about 20 percent by weight of the ink formulation, about 25 percent by weight of the ink formulation, or any ranges therebetween. For example, the colorant may be any suitable dye, pigment, or other coloring agent, or combination thereof, which are known in the art.

In certain embodiments, the ink formulation also includes a cap-off agent present in an amount of from about 0.1 percent to about 5 percent, by weight of the ink formulation, for example about 0.1 percent by weight of the ink formulation, about 0.5 percent by weight of the ink formulation, about 1 percent by weight of the ink formulation, about 2 percent by weight of the ink formulation, about 3 percent by weight of the ink formulation, about 4 percent by weight of the ink formulation, about 5 percent by weight of the ink formulation, or any ranges therebetween. For example, the cap-off agent may be any suitable agent configured to prevent the ink formulation from drying out when left in an uncapped writing instrument (e.g., marker, pen). For example, a suitable cap-off agent may be CA 340.2 and/or CA210.2, manufactured by Multichem (United Kingdom), and/or other suitable additives, specialty waxes and/or surfactants that could also function as cap-off agents.

In certain embodiments, the ink formulation also includes one or more additives. For example, suitable additives may include UV stabilizers, adhesion promoters, and releasing agents, which are known in the art.

Writing Instruments

Writing instruments containing the ink formulations described herein are also provided. For example, the writing instrument may be any suitable type of writing instrument design known in the art, such as permanent markers, dry erase markers, and pens, including ballpoint pens. The writing instrument may contain the ink formulation in a suitable reservoir configured to deliver the ink to a nib or instrument tip, for delivery onto a substrate.

In certain embodiments, the writing instrument displays a cap-off time (i.e., time after which a writing instrument containing the ink formulation becomes unusable/dried out when the instrument is left uncapped) of at least 3 hours. In some embodiments, the writing instrument displays a cap-off time (i.e., time after which a writing instrument containing the ink formulation becomes unusable/dried out when the instrument is left uncapped) of at least 3 hours.

EXAMPLES

The present disclosure may be better understood with reference to the following non-limiting examples.

Permanent Marker Inks

Permanent marker ink formulations were prepared in accordance with the above-described ink formulations.

First, a permanent marker ink for industrial applications, such as for construction industries and metal shops, was prepared. Such permanent markers for industrial applications require that the marker inks write on both watery/wet surface and oily surfaces, and that the ink stays on these surface with acceptable resistance.

Historically, in permanent marker ink formulations, xylene was used as the solvent. For example, xylene displays good solubility for oil soluble dyes, ink resins and/or ink polymers. Some xylene based permanent ink markers are still used in specialty writing products because the maker inks based on xylene display fast drying and can write through/on watery/wet surfaces, although not well on oily surfaces. However, xylene displays a toxicity such that it is not desirable for use in a general purpose marker ink formulation. Thus, many permanent marker ink formulations now use alcohol-based solvent that display reduced writing performance. For example, such markers typically have less than one hour of cap-off time (i.e., time after which a writing instrument containing the ink formulation becomes unusable/dried out when the instrument is left uncapped).

Thus, in some embodiments, the disclosed ink formulations have been developed to provide improved permanent maker inks with lactate esters, blends of lactate ester with other esters (such as acetate esters and/or propionate esters), alcohols, glycol ethers and/or hydrocarbon solvents. By adjusting the ratio of lactate esters with other solvents in the blends to tune/adjust the balance of the ink hydrophilicity and hydrophobicity, the improved permanent ink with lactate esters and its blend with other solvents were found to write better on both wet and oily surface than xylene based permanent maker inks for industrial uses. Moreover, some fade resistance dyes and hydrophilic resins, which are normally not soluble in xylene, were discovered to also be usable in the disclosed permanent marker inks to further enhance fade resistance and the ability write on oily surface or ink permanence on oily surface.

One embodiment of a permanent ink formulation is shown in the following table (Table 1):

TABLE 1

Exemplary Permanent Marker Inks for Industrial Uses

| | | |
|---|---|---|
| Solvent Blend | 45 to 95% | |
| Lactate Esters | | |
| Other Esters (such as acetates and propionates) | | |
| Alcohols | | |
| Resins or Polymers | 3 to 25% | Soluble or compatible in solvent blend |
| Colorant Blend (Dyes and/or Pigments) | 3 to 25% | Soluble or compatible in solvent blend |
| Cap-off Agents | 0.1 to 5% | Compatible in solvent blend |
| Other Additives | 0 to 10% | Soluble or Compatible with solvent blend |

As can be seen, the weight percent of lactate ester or ester blends and/or blends of lactate esters with other solvents in the ink formulation is from 45% to 95%. These permanent marker ink formulations for industrial usages not only displayed improved ink performance but are also more environmentally friendly and more sustainable when one or more or all the lactate esters and other solvents in the blends (other esters, glycol ethers, alcohols and hydrocarbon solvents), and/or the resin/polymer and additives are bio-based or from renewable resources.

Another advantage of these ink formulations is that the cap-off agents, such as CA 340.2, may be used to extend ink marker cap-off time up to more than 10 hours, while, in contrast, there is no commercially available cap-off agent for xylene-based marker inks.

Second, a permanent marker ink formulation for general applications (i.e., non-industrial) was prepared. Historically, xylene and 2-butoxyethanol and/or other glycol ether solvents, both of which display a toxicity such that they are not desirable for use in a general purpose marker ink formulation, were widely used as solvents in permanent marker inks. Currently, the majority of permanent marker inks for general usage are based on lower alcohol solvents. These solvents are normally weaker solvents for dissolving ink dye and resin/polymer and limit the choices of ink dyes and resins/polymers for the permanent marker inks for general usage.

Thus, in some embodiments, the disclosed ink formulations use lactate esters and/or blends of lactate esters with d-limonene, and/or alcohols in the improved permanent marker inks for general usages. The usage of these lactate esters and blends of lactate esters with other solvents broadens the choices of ink resin/polymers and ink dyes, especially some fade resistance dyes which is normally not soluble in lower alcohols, and improves ink performance with better fade resistance and adhesion.

One embodiment of an ink formulation for a general use permanent marker is shown in the table below (Table 2):

TABLE 2

The Exemplary Permanent Marker Inks for General or Consumer Use

| | | |
|---|---|---|
| Solvent Blend | 45 to 95% | |
| Ethyl and/or methyl lactates | | |
| Glycol ethers and/or d-limonene | | |
| Alcohols | | |
| Resins or Polymers | 1 to 20% | Soluble or compatible in solvent blend |
| Colorant Blend (Dyes and/or Pigments) | 3 to 25% | Soluble or compatible in solvent blend |
| Cap-off Agents | 0 to 5% | Compatible in solvent blend |
| Other Additives | 0 to 10% | Soluble or Compatible with solvent blend |

As can be seen, the weight percent of lactate ester or esters and/or blends of lactate esters with other solvents in the ink is from 45% to 95%. The disclosed permanent marker inks for general usages were found not only to display improved ink performance but are also more environmentally friendly and more sustainable when one or more or all the lactate esters and other solvents in the blends and/or the resin/polymer and additives are bio-based or from renewable resources.

The cap-off agents, such as CA 340.2 and/or CA210.2, can be added into these permanent marker inks for general usages to extend ink cap off time to more than 5 days although the cap-off agents are not necessary for the invented marker inks to have sufficient cap-off time (less than 2 hours) for normal general usages.

Dry Erase Marker Inks

Historically, methyl ethyl ketone (MEK) and other ketones were the solvents used for dry erase marker inks. However, these solvents were replaced with low alcohols for lower erasing performance because of both strong odor of ketone solvents and regulatory or hazardous status of MEK.

Thus, in some embodiments, dry erase marker ink formulations were prepared using lactate esters and/or their blends with other esters, alcohols and other solvents. These dry erase inks were found to have similar dry erasability as ketone based dry erase inks without strong ketone odor and toxicity.

One embodiment of an ink formulation for a dry erase marker is shown in the following table (Table 3):

TABLE 3

Exemplary Dry Erase Marker Inks

| Solvent Blend | 45 to 95% | |
| --- | --- | --- |
| Lactate Esters | | |
| Other Esters (such as acetates and propionates) | | |
| Alcohols | | |
| Resins or Polymers | 1 to 25% | Soluble or compatible in solvent blend |
| Colorant Blend (Pigments or Pigment Dispersions) | 3 to 25% | Soluble or compatible in solvent blend |
| Releasing Agents | 1 to 30% | Soluble or compatible in solvent blend |
| Cap-off Agents | 0.1 to 5% | Compatible in solvent blend |
| Other Additives | 0 to 10% | Soluble or Compatible with solvent blend |

One embodiment of a lower odor version of a dry erase marker ink is shown in the table below (Table 4):

TABLE 4

The Exemplary Erase Marker Inks with Lower Odor

| Solvent Blend | 45 to 95% | |
| --- | --- | --- |
| Ethyl and/or methyl lactates | | |
| d-limonene and/or glycol ethers | | |
| Alcohols | | |
| Resins or Polymers | 1 to 20% | Soluble or compatible in solvent blend |
| Colorant Blend (Dyes and/or Pigments) | 3 to 25% | Soluble or compatible in solvent blend |
| Releasing Agents | 1 to 30% | Soluble or compatible in solvent blend |
| Cap-off Agents | 0.1 to 5% | Compatible in solvent blend |
| Other Additives | 0 to 10% | Soluble or Compatible with solvent blend |

As can be seen, the weight percent of lactate ester or esters and/or blends of lactate esters with other solvents in the ink is from 45% to 95%. The disclosed dry erase marker inks were found to not only display improved ink performance but are also more environmentally friendly and more sustainable when one or more or all of the lactate esters and other solvents in the blends (other esters, alcohols, glycol ethers), and/or the resin/polymer and additives are bio-based or from renewable resources.

The cap-off agents, such as CA 340.2 and/or CA210.2, including additives, specialty waxes and/or surfactants which could function as cap-off agents, could be added into the invented dry erase marker inks to extend ink cap off time.

Ballpoint Pen Inks

Historically, in ball point pens, ethylene or propylene glycol ether solvents (such as diethylene glycol monoethyl ether/glycol ether DE or ethylene glycol phenyl ether (EPH)) and benzyl alcohol are used. These solvents are currently produced from petroleum/fossil sources and may contain toxic residue of ethylene oxide or propylene oxide (for glycol ether based solvents) and toluene (for benzyl alcohol).

In some embodiments, ball point pen ink formulations were prepared using lactate esters, blend solvents of lactate esters with d-limonene, alcohols and other solvents. These inks were found to provide wider choices of ink dyes and ink resins/polymers. For example, it was discovered that the formulations could include fade resistant dyes and more durable resins/polymers to increase ball point pen ink resistance properties, such as color fading resistance.

One embodiment of a ball point pen ink formulation is shown in the table below (Table 5):

TABLE 5

The Exemplary Ball Point Pen Inks

| Solvent Blend | 35 to 95% | |
| --- | --- | --- |
| Ethyl and/or methyl lactates | | |
| d-limonene and/or glycol ethers | | |
| Alcohols | | |
| Resins or Polymers | 3 to 40% | Soluble or compatible in solvent blend |
| Colorant Blend (Dyes and/or Pigments) | 5 to 45% | Miscible or compatible in solvent blend |
| Other Additives | 0 to 10% | Soluble or Compatible with solvent blend |

As can be seen, the weight percent of lactate ester or esters and/or blends of lactate esters with other solvents in the ink formulation is from 35% to 99%. The disclosed ball point pen inks were found not only to display improved ink performance but also are more environmentally friendly and more sustainable when one or more or all of the lactate esters and other solvents in the blends (other esters, alcohols, glycol ether) and/or the resin/polymer and additives are bio-based or from renewable resources.

Overall, it was discovered that traditional ink formulation solvents can be replaced with lactate esters and/or solvent blends of lactate esters with other solvents, such as other esters, alcohols, glycol ethers, d-limonene and/or aliphatic hydrocarbon solvents. These new ink formulations were found not only to write well, and have improved ink performance, but also to be more environmentally friendly with better sustainability, when part or all of lactate esters and blending solvents are bio-based or from renewable resources. Indeed, lactate esters, and blends of lactate esters with other solvents from renewable resources were used to replace petroleum based solvents and hazardous solvents.

The ink formulations disclosed herein were found to provide the same or better properties, without the toxicity, as prior ink formulations.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An ink formulation consisting of:
   an ink resin or polymer;
   a colorant present in an amount from about 3 percent to about 40 percent, by weight of the ink formulation;
   a biobased solvent present in an amount of about 35 percent to about 45 percent, by weight of the ink formulation; and
   a cap-off agent present in an amount of from about 0.1 percent to about 5 percent, by weight of the ink formulation;
   wherein the biobased solvent is consists of one or more lactate esters; and
   wherein the ink formulation is suitable for use with a writing instrument.

2. The ink formulation of claim 1, wherein the biobased solvent consists of one or more bio-lactate esters.

3. The ink formulation of claim 1, wherein the ink resin or polymer is present in an amount of from about 1 percent to about 40 percent, by weight of the ink formulation.

4. The ink formulation of claim 1, wherein the ink resin or polymer is present in an amount of from about 3 percent to about 25 percent, by weight of the ink formulation.

5. The ink formulation of claim 1, wherein the ink formulation contains no petroleum based solvents.

6. An ink formulation consisting of:
   an ink resin or polymer;
   a colorant;
   a solvent consisting of one or more lactate esters; and
   a cap-off agent;
   wherein the solvent is present in an amount of about 35 percent to about 95 percent, by weight of the ink formulation, and wherein the cap-off agent is present in an amount of from about 0.1 percent to about 2.5 percent, by weight of the ink formulation; and
   wherein the ink formulation is suitable for use with a writing instrument.

7. The ink formulation of claim 6, wherein the at least one lactate ester is ethyl lactate, methyl lactate, n- or iso-propyl lactates, n- or iso-butyl lactates, i-amyl lactate, and/or 2-ehtylhexyl lactate.

8. The ink formulation of claim 6, wherein the solvent consists of one or more bio-lactate esters.

9. The ink formulation of claim 6, wherein the ink resin or polymer is present in an amount of from about 1 percent to about 40 percent, by weight of the ink formulation.

10. The ink formulation of claim 6, wherein the ink resin or polymer is present in an amount of from about 3 percent to about 25 percent, by weight of the ink formulation.

11. The ink formulation of claim 6, wherein the colorant present in an amount of from about 3 percent to about 40 percent, by weight of the ink formulation.

12. The ink formulation of claim 6, wherein the ink formulation contains no petroleum based solvents.

* * * * *